US006307659B1

(12) United States Patent
Gilliland et al.

(10) Patent No.: US 6,307,659 B1
(45) Date of Patent: Oct. 23, 2001

(54) OPTOELECTRONIC TRANSCEIVER HAVING AN ADAPTABLE LOGIC LEVEL SIGNAL DETECT OUTPUT

(75) Inventors: Patrick B. Gilliland, Chicago; Michael F. Leger, Naperville, both of IL (US)

(73) Assignee: Stratos Lightwave, Inc., Chicago, IL (US)

( * ) Notice: Subject to any disclaimer, the term of this patent is extended or adjusted under 35 U.S.C. 154(b) by 0 days.

(21) Appl. No.: 08/935,483

(22) Filed: Sep. 24, 1997

(51) Int. Cl.$^7$ ................................................. H04B 10/00
(52) U.S. Cl. ........................ 359/152; 359/153; 359/189; 359/195
(58) Field of Search ................................... 359/152, 153, 359/189, 195

(56) References Cited

U.S. PATENT DOCUMENTS

| 3,526,784 | 9/1970 | Beydler et al. | 307/208 |
|---|---|---|---|
| 4,535,294 | 8/1985 | Ericksen et al. | 328/150 |
| 4,545,076 | * 10/1985 | Biard et al. | 359/189 |

(List continued on next page.)

OTHER PUBLICATIONS

Anigbo et al, "Design Of A Compact, High Speed Optical Transceiver Using Two Step Overmolding", IEEE Transactions on components packaging and manufacturing technology–part B, vol.19, No. 3, pp. 562–568, Aug. 1996.*
Product sheet of TS–S97D022A, Aug, 1996.*
Sumitomo Electric Device SDM 4201-XC, Sep. 1995.*
LMC 7211 product sheet, of record in the application, Oct. 1999.*
LMC 7221 product sheet of record in the application, Oct. 1999.*
Understanding Solid–State Electronics—vol. II; pp. 10–4–10–5; paragraphs Light Intensity Detector and Magnetic Field Detector.

Primary Examiner—Leslie Pasal
(74) Attorney, Agent, or Firm—Steven M. Evans

(57) ABSTRACT

An optoelectronic transceiver is provided having an adaptable logic level signal detect output. The preferred embodiments are configured to generate various logic level signal detected signals directly for use by the transceiver host device. A first embodiment generates the SD output based on the actual optical power received over the optical transfer medium. When the received optical power exceeds a predetermined threshold, the monitor voltage exceeds the reference voltage, and the signal detected output is set. The output stage of the circuit can be configured such that in the true state, meaning a signal has been detected, a TTL level signal, a CMOS signal, or a high voltage or high current signal is set to true. The high voltage and high current configurations may be set to any value required under the specific requirements of the application. In a second embodiment an AC signal detecting circuit generates the SD output. A peak signal is compared against an average voltage signal, and when the peak signal exceeds the average signal by a predetermined amount, the SD output is set true. As with the first embodiment, the output stage of the circuit can be configured such that in the true state, meaning a signal has been detected, a TTL level signal, a CMOS signal, or a high voltage or high current signal is set to true. The high voltage and high current configurations may be set to any value required under the specific requirements of the application. Multiple solder pads may be provided on the transceiver printed circuit board such that additional biasing components can be added to the output circuitry. The prearranged solder pads allow the SD output to be adaptable to any logic level that a specific application requires.

11 Claims, 5 Drawing Sheets

U.S. PATENT DOCUMENTS

| | | | |
|---|---|---|---|
| 5,251,054 | 10/1993 | Lynn | 359/189 |
| 5,416,871 * | 5/1995 | Yakahashi et al. | 385/88 |
| 5,459,427 | 10/1995 | Chambers et al. | 327/333 |
| 5,481,104 | 1/1996 | Miller et al. | 250/214 |
| 5,502,405 | 3/1996 | Williams | 326/66 |
| 5,528,172 | 6/1996 | Sundstrom | 326/80 |
| 5,528,408 | 6/1996 | McGinley et al. | 359/152 |
| 5,600,471 * | 2/1997 | Hirohashi et al. | 359/152 |
| 5,734,170 | 3/1998 | Ikeda | 250/551 |
| 5,791,295 | 8/1998 | Devon | 359/189 |
| 5,829,124 | 11/1998 | Kresge et al. | 29/840 |
| 5,920,731 * | 7/1999 | Pletl et al. | 395/834 |
| 5,969,841 * | 5/1995 | McGinley et al. | 359/163 |

\* cited by examiner

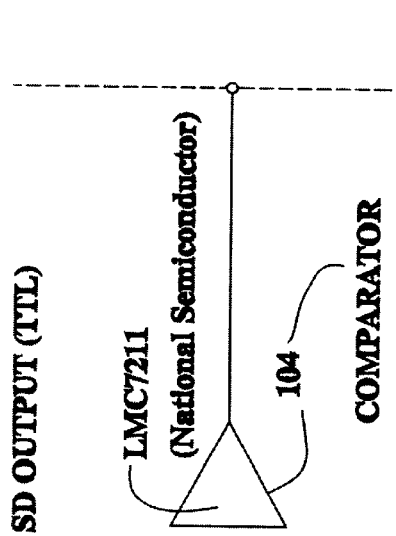
Fig. 3b
SD OUTPUT (TTL)
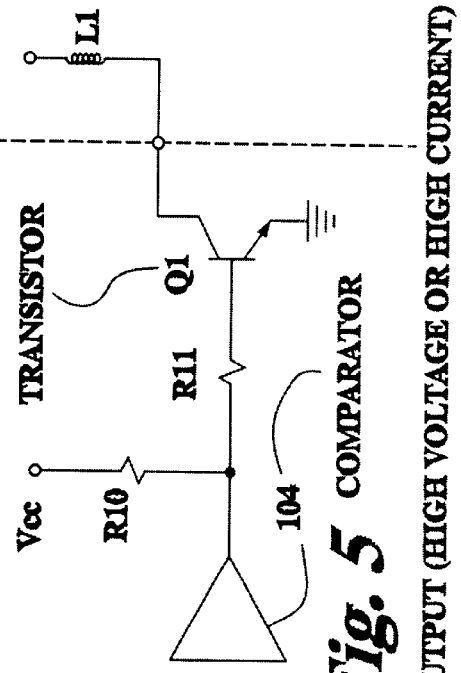
Fig. 5 COMPARATOR
SD OUTPUT (HIGH VOLTAGE OR HIGH CURRENT)
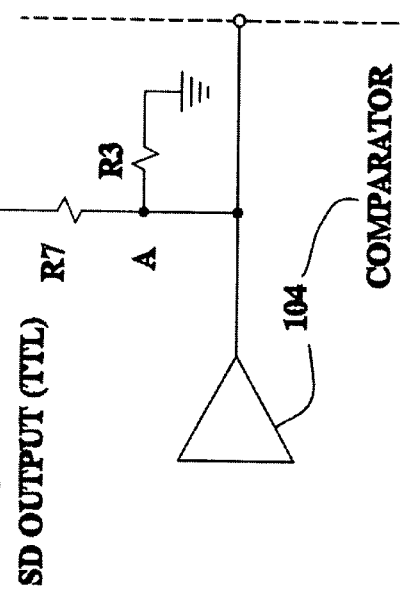
Fig. 3a
SD OUTPUT (TTL)
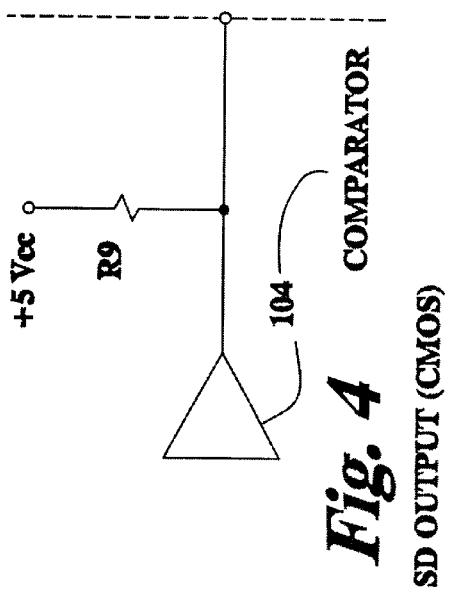
Fig. 4 COMPARATOR
SD OUTPUT (CMOS)

Fig. 3c
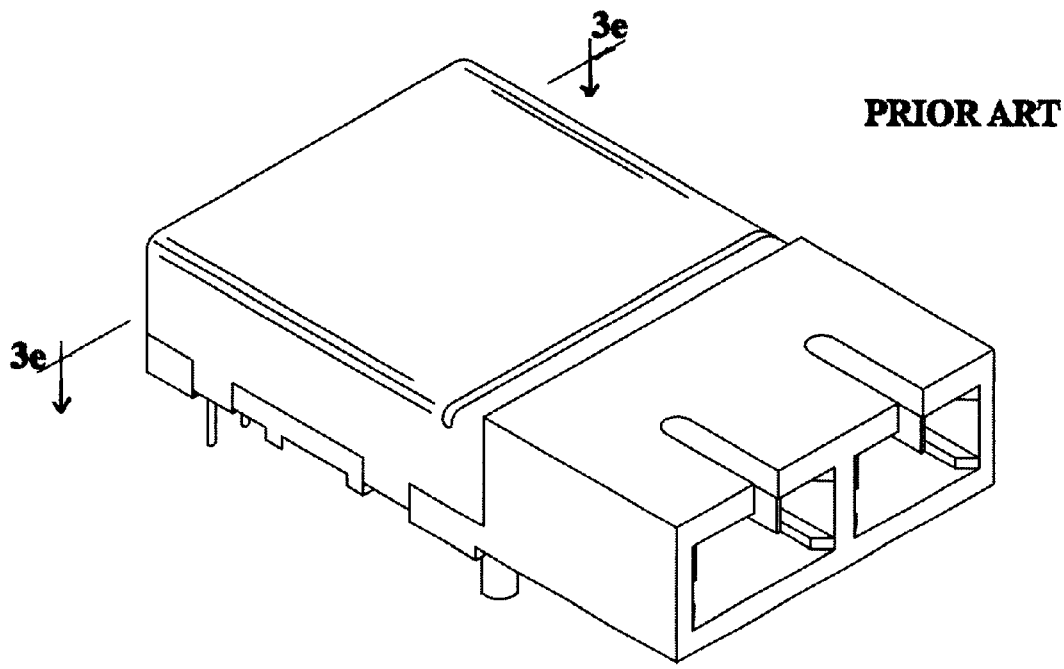
PRIOR ART
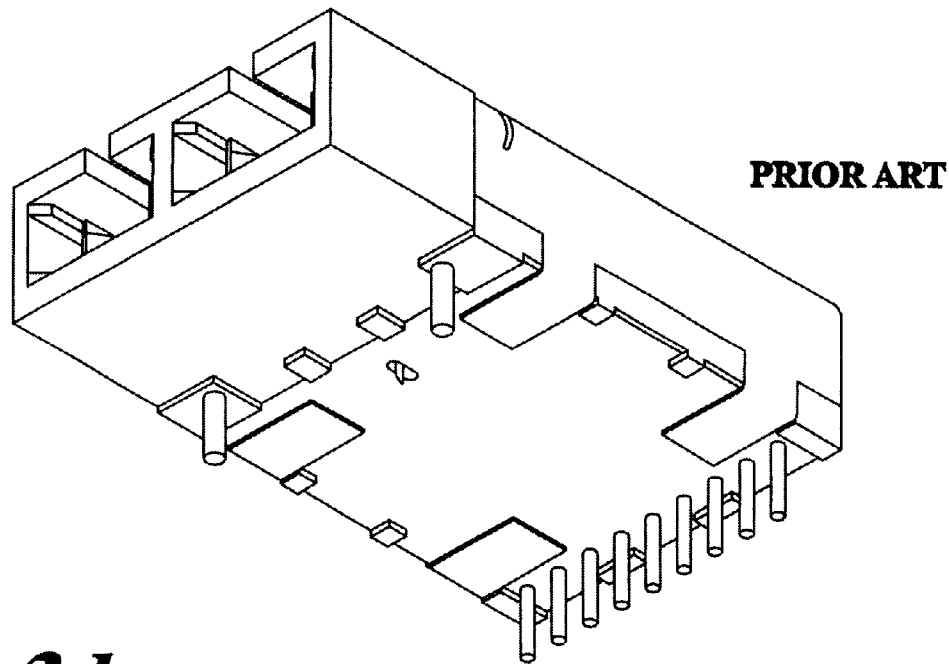
PRIOR ART
Fig. 3d

PRINTED CIRCUIT BOARD
WITH SELECTIVE CONFIGURATION
OF SD OUTPUT LOGIC LEVEL

OPTOELECTRONIC TRANSCEIVER HAVING AN ADAPTABLE LOGIC LEVEL SIGNAL DETECT OUTPUT

BACKGROUND OF THE INVENTION

The present invention provides an improved optoelectronic transceiver having a signal detect output which can be adapted to any particular logic level required by a host device.

Optoelectronic transceivers are well known in the art. In general, such transceivers are employed to optically transmit and receive data between two or more electronic host devices. To transmit data, the optoelectronic transceiver receives an electrical data signal from its host device, converts the electrical data signal to an optical signal, and transmits the optical signal over a transfer medium such as an optical fiber. On the receive side of the optoelectronic transceiver, optical signals are received over the optical transfer medium and converted into electrical data signals which are communicated to the host device.

The transceiver is usually mounted on or adjacent to the motherboard of the host device. Data communication between the host device and the transceiver is managed by a controller chip such as a Media Access Controller, or MAC, chip. The MAC chip resides on the mother board, and controls the flow of data between the host's processing unit and the transceiver module. Thus all data signals, as well as diagnostic and control signals generated by either the host device or the transceiver module, and relating to the communication of data over the optical data link must be input to the MAC chip so that the controller can act on them accordingly.

One such signal which is commonly generated by optoelectronic transceivers, particularly in 1×9 transceiver packages, is an optical signal detected signal or SD. The SD signal is input to the media controller from the transceiver in order to alert the host device that an optical signal is being received. In present generation transceiver modules such as the 1×9, the SD signal supplied to the host device is an emitter coupled logic (ECL) or positive emitter coupled logic (PECL) signal. Due to the relatively small voltage difference between logic levels, ECL or PECL are the preferred logic for high speed data communications modules. However, most host devices and media controllers operate using other logic levels such as CMOS or TTL. Thus, there is an interface problem between the ECL or PECL SD signal and the TTL or CMOS level circuitry of the host device.

To date, the interface problem has been resolved by adding an ECL/TTL converter chip (or some other converter chip depending on the particular logic levels being converted) directly to the motherboard of the host device. A converter chip accepts the ECL level SD signal and converts it to a TTL level signal which is then input to the media controller chip. A drawback to this solution, however, is that it adds cost to the production of the motherboard. Another drawback is that the extra semiconductor chip required to convert the ECL level signal to TTL consumes space on the mother board. In most electronic equipment miniaturization is of extreme importance, and real estate on the motherboard comes at a premium. The added converter chip required to adapt the SD signal occupies valuable space which could otherwise be used for additional circuit features to enhance the functionality of the host device.

To avoid this interface problem in a cost effective manner, and to save space on the host device motherboard, an optoelectronic transceiver is needed having an optical signal detected output which has a logic level specifically adapted to the logic level of the media controller with which it will interface. In an improved transceiver module the SD signal should be generated directly at the logic level required, without the need for a converter chip. It is also desirable that the SD output be configurable such that selective placement of external resistors will adapt the SD to a particular logic level. It is even more desirable that such an optoelectronic transceiver module having an adaptable SD output be provided in an 1×9 transceiver package wherein the adaptable logic levels include TTL, CMOS, or a high voltage output.

SUMMARY OF THE INVENTION

In light of the background given above, one of the main objectives of the present invention is to provide an optoelectronic transceiver having an optical signal detected, or SD, output to provide indication to a host device that an optical signal is being received, the logic level of the output being compatible with the logic level of the media controller of the host device.

A further object of the present invention is to provide an optoelectronic transceiver module having a TTL level SD output.

Another objective of the present invention is to provide an optoelectronic transceiver module having a CMOS level SD output.

Still another objective of the present invention is to provide an optoelectronic transceiver module having a high voltage or high current SD output.

Yet another objective of the present invention is to provide a 1×9 transceiver package with an SD output matched to the host device's media controller.

An additional objective of the present invention is to provide a transceiver package having an adaptable logic level SD output wherein the logic level of the SD output signal is configurable through the addition of external biasing components.

All of these objectives, as well as others that will become apparent upon reading the detailed description of the presently preferred embodiments of the invention, are met by the optoelectronic transceiver having an adaptable logic level signal detect signal disclosed herein. The preferred embodiment of the invention is a small footprint transceiver such as a 1×9 package, however, the invention may be practiced on any optoelectronic transceiver of any form factor.

A first embodiment generates the SD output based on the actual optical power received over the optical transfer medium. The received power is converted to a monitor voltage which is compared to a reference voltage. When the received optical power exceeds a predetermined threshold, the monitor voltage exceeds the reference voltage, and the signal detected output is set. The output stage of the circuit can be configured such that in the true state, meaning a signal has been detected, a TTL level signal, a CMOS signal, or a high voltage or high current signal is set to true. The high voltage and high current configurations may be set to any value required under the specific requirements of the application.

In a second embodiment an AC signal detecting circuit generates the SD output. The signal received over the optical transfer medium is converted to an electrical signal and input to both a peak detecting circuit and an average voltage detecting circuit. The peak signal is compared against the average voltage signal, and when the peak signal exceeds the average signal by a predetermined amount, the SD output is set true. As with the first embodiment, the output stage of the circuit can be configured such that in the true state, meaning a signal has been detected, a TTL level signal, a CMOS signal, or a high voltage or high current signal is set to true. The high voltage and high current configurations may be set to any value required under the specific requirements of the application.

In both embodiments, by generating the output signal at the proper logic level directly, the necessity of including a logic signal converter is avoided. This saves cost in the production of both the transceiver module and the host device. It also conserves board space on both the transceiver and host device mother board so that additional circuit features may be provided. Additionally, the transceiver module's printed circuit board can be layed out such that any logic level may be selected for the SD output by selectively biasing the output stage of the SD circuitry. Multiple solder pads may be provided such that additional biasing components can be added to the output circuitry. These additional components may range from pullup resistors, or voltage divider resistors to the addition of a high voltage output transistor. The prearranged solder pads allow the SD output to be adaptable to any logic level that a specific application requires.

BRIEF DESCRIPTION OF THE DRAWINGS

FIG. 3a is a schematic diagram of the output stage of a SD output circuit according to the present invention configured to provide a TTL signal;

FIG. 3b is a schematic diagram of the output stage of a SD output circuit according to the present invention showing an alternate configuration for supplying a TTL signal;

FIG. 3c is a perspective view of the outer housing of a prior art 1×9 optoelectronic transceiver having an SC-duplex receptacle for connecting to an SC-duplex fiber optic connector;

FIG. 3d is a perspective view showing the 1×9 pins on the bottom of the optoelectronic transceiver shown in FIG. 3c;

FIG. 4 is a schematic diagram of the output stage of a SD output circuit according to the present invention configured to provide a CMOS signal;

FIG. 5 is a schematic diagram of the output stage of a SD output circuit according to the present invention configured to provide either a high voltage or a high current output signal.

DETAILED DESCRIPTION OF THE PRESENTLY PREFERRED EMBODIMENTS

Figures 1, 2:
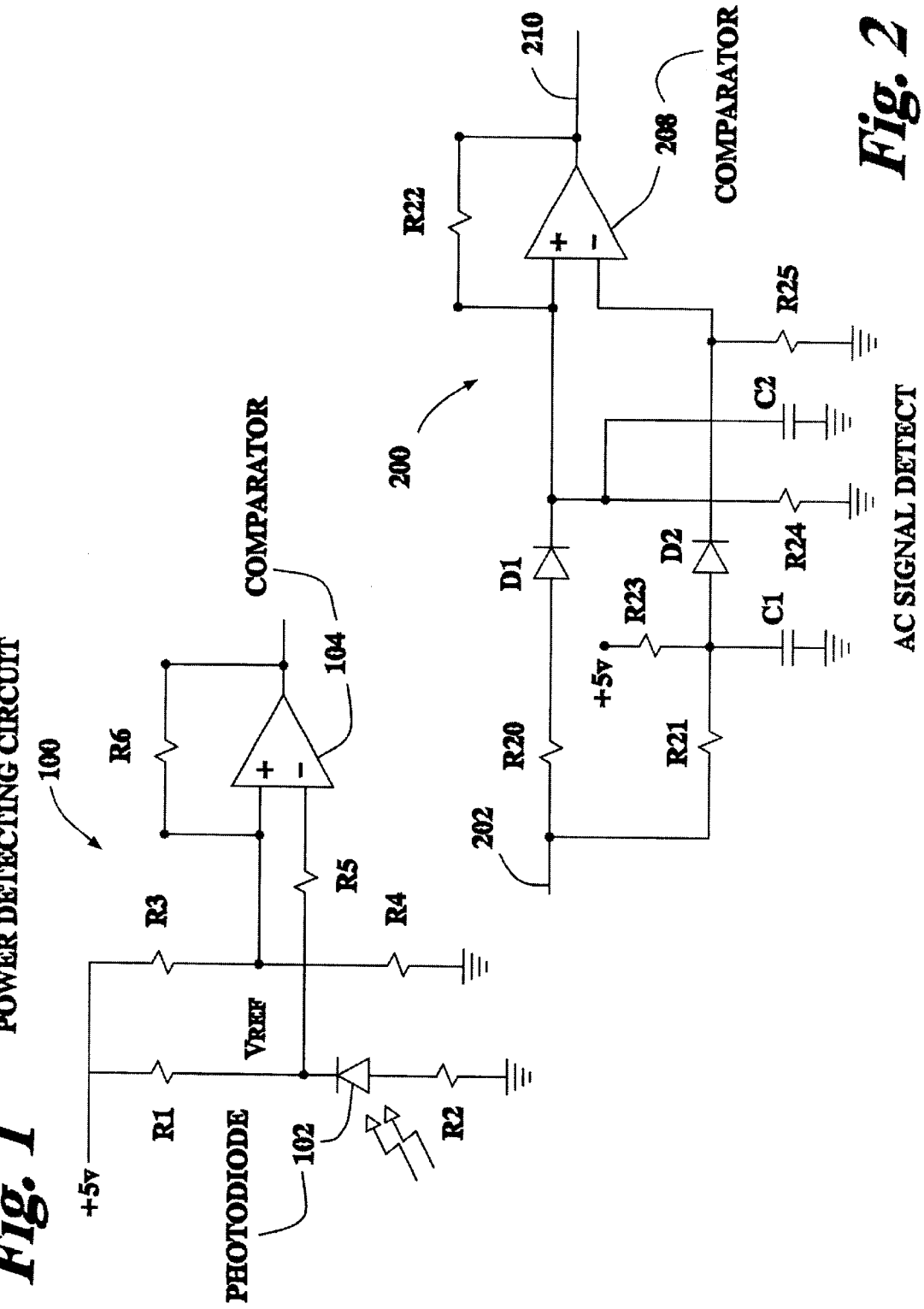
FIG. 1 is a schematic diagram of an optical power detecting circuit.
FIG. 2 is a schematic diagram of an AC signal detect circuit.

The present invention provides an improved optoelectronic transceiver having a signal detect output which can be adapted to any particular logic level required by a host device. FIG. 1 shows a schematic diagram of a first embodiment of an optical signal detect circuit 100. The optical signal detect circuitry senses the presence of optical power received directly from the optical transfer medium. Signal detection circuitry 100 includes a photodiode 102, a voltage comparator 104, and resistors $R_1$–$R_6$.

Resistors $R_3$ and $R_4$ are connected in series between a +5V voltage source and ground, creating a voltage divider between $R_3$ and $R_4$. The junction between $R_3$ and $R_4$ is connected to the non-inverting input of comparator 104. Thus, a reference voltage $V_{REF}$ is established based on the resistive ratio between $R_3$ and $R_4$. $V_{REF}$ is input to the non-inverting input of comparator 104. $V_{REF}$ equals the 5V supply voltage minus the voltage drop across $R_3$. It is preferred that, $R_3$=274Ω, and $R_4$=220 KΩ, establishing a voltage drop of 6.22 mV across $R_3$. As will be shown below, The 6.22 mV voltage drop across $R_3$ establishes the power threshold of a received optical signal above which the received power detection circuitry 100 will indicate that a signal is present. This power threshold may be altered as desired by altering the resistance ratio between $R_3$ and $R_4$, thereby establishing an alternate $V_{REF}$.

$R_1$, photodiode 102, and $R_2$ are also connected in series between the +5V voltage source and ground. Photodiode 102 is connected between $R_1$ and $R_2$ with the cathode connected to $R_1$ and the anode connected to $R_2$. The +5V source reverse biases photodiode 102, and the optical radiation received over the optical transfer medium modulates the reverse current allowed to pass through photodiode 102. Thus, the amount of current flowing through $R_1$ and $R_2$ is regulated by photodiode 102. Photodiode 102 is sized such that the reverse current through photodiode 102 varies on the order of 0.5A per watt of received optical energy. Since the reverse current is dependent on the amount of optical power detected, the reverse current can be considered the signal detect current, or $I_D$. Since inverting input of comparator 104 typically draws only 0.04 pico amperes of current, for all practical purposes, photodiode 102 is the only current sinking device connected to $R_1$, and the reverse current $I_D$ is the only current flowing through $R_1$. Therefore, the current $I_D$ creates a signal detect voltage drop $V_D$ across $R_1$, and since $I_D$ varies according to the amount of optical power received by photodiode 102, $V_D$ likewise varies according to the amount of optical power received. The junction between $R_1$ and the cathode of photodiode 102 is connected to the inverting terminal of comparator 104 through resistor $R_5$. Since the input resistance to comparator 104 is theoretically infinite, the current flowing through $R_5$ is negligible, and consequently there is little or no voltage drop across $R_5$. Thus, the voltage present at the inverting terminal of comparator 104 is approximately equal to the 5V supply voltage minus the voltage drop $V_D$ across $R_1$. $R_5$ is merely added to reduce the amount of high frequency noise being coupled to photodiode 102. Since the voltage present at the inverting terminal of comparator 104 is determined by the voltage drop $V_D$ across $R_1$, and the voltage present at the non-inverting terminal of comparator 104 is determined by the voltage drop across $R_3$, comparator 104 effectively compares the two voltage drops.

The output of comparator 104 will be set to a true logic state when the voltage present on the non-inverting terminal is greater than the voltage present on the inverting terminal. Stated conversely, the output of comparator 104 will be set true whenever the voltage drop across $R_1$ is greater than the voltage drop across $R_3$. The voltage drop across $R_3$ is fixed by the resistive ratio between $R_3$ and $R_4$. The voltage drop across $R_1$, however, varies with the intensity of the received optical signal, the voltage drop increasing with the intensity of the optical signal. Thus, when the received optical signal exceeds the level necessary to create a voltage drop across $R_1$ greater than the 6.22 mV drop across $R_3$, the output of comparator 104 is set to true, indicating that a signal has been detected. R6 provides hysteresis so that the SD asserted level is higher than the deasserted level by approximately 1.5 db.

Power detection circuitry 100 further includes an output stage for driving the logic output signal, SD. Several different output configurations are contemplated. FIGS. 3a, 3b, 4, and 5, for example, disclose output stages for SD output signals having TTL, CMOS, and high voltage or high current outputs respectively. In the TTL output stage of FIG. 3a, the output of comparator 104 is pulled up through a passive biasing network comprised of resistors $R_7$ and $R_8$. Resistors $R_7$ and $R_8$ are connected in series between the +5V supply voltage and ground. Resistors $R_7$ and $R_8$ create a voltage divider wherein a reference voltage is established at node A created by the junction of the two resistors $R_7$ and $R_8$. Node A is connected to the output of comparator 104. Comparator 104 is an open drain device such as, for example, an LMC 7221 produced by National Semiconductor. When the output of comparator 104 is set to a logic true, the output of comparator 104 is pulled up to the reference voltage established at node A. When comparator 104 is set to a false logic state, the output is pulled to ground. Therefore, by properly selecting resistors $R_7$ and $R_8$, the voltage difference between a false logic state and a true logic state can be established at any level between 0 and 5 volts. However, in order to be compatible with TTL standards, in the true state, the output must supply a minimum of 0.4 mA at 2.4 V. In the preferred embodiment shown in FIG. 3, resistors $R_7$ and $R_8$ are sized at 1 KΩ and 2 KΩ respectively, to establish a true logic voltage of 3.33V.

Figure 3E:
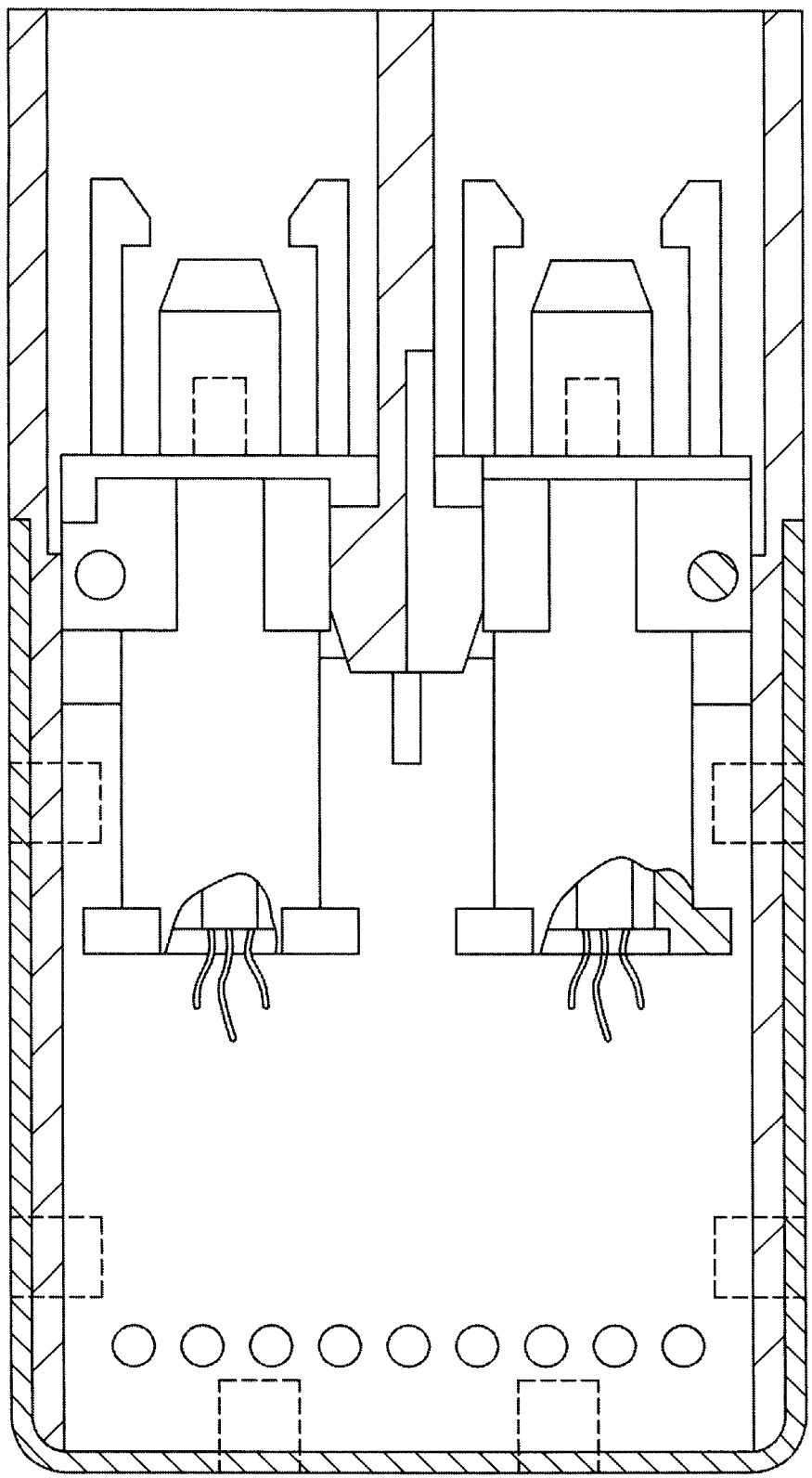
FIG. 3e is an enlarged cut-away view of the optoelectronic transceiver shown in and taken along line 3e—3e of FIG. 3c, which shows the transmit and receive optical subassemblies.

As an alternative to the biasing network shown in FIG. 3a, the open drain output of comparator 104 can be replaced with a true TTL device such as an LMC7211. In this configuration, a pair of complimentary MOSFET transistors are arranged in a push-pull configuration to supply a TTL output directly, as shown in FIG. 3b. However, this configuration loses some of the design flexibility inherent in the configuration of FIG. 3a. In FIG. 3b, the voltage level and output current of the SD output signal are determined by the LMC7211 comparator chip, and cannot be as readily manipulated as in the circuit shown in FIG. 3a.

Turning to FIG. 4, a CMOS output stage is disclosed. Here again, comparator 104 has an open drain output as embodied in the LMC7221 comparator chip. A single pull up resistor $R_9$ is connected between the +5V supply and the output of comparator 104. Since a CMOS input draws very little current, $R_9$ can be very much larger than resistors $R_7$ and $R_8$ of the previous embodiment, such as the 10 KΩ resistor employed in FIG. 4. When the output of comparator 104 is set to a true logic state, the SD output is pulled up directly to the +5V supply through resistor $R_9$. As with the previous embodiment, in a false logic state, the SD output is pulled down to ground.

FIG. 5 shows yet another configuration for the output stage of the SD signal. Comparator 104 comprises the same open drain LMC7221 comparator as the previous embodiments, however, resistors $R_{10}$, $R_{11}$, and transistor $Q_1$ are added to the output as well. The output of comparator 104 is connected to the base of transistor $Q_1$ through resistor $R_{11}$, and pulled up to +5V through resistor $R_{10}$. With comparator 104 set to a true logic state, comparator 104 is nonconductive and the output is pulled up to +5V. The +5V on the comparator 104 output forward biases the base emitter junction of transistor Q1, allowing a large current to flow into the collector. Conversely, with the output of comparator 104 set to a false logic state, the output of comparator 104 is pulled to ground and the base-emitter voltage applied to Q1 is essentially brought to 0V, so that virtually no current flows into the collector. In other words, Q1 acts as a switch which is controlled by the output of comparator 104. Q1 may be selected to accommodate either high voltage or high current loads, as represented by coil L1. Thus, the signal detect output can be employed to drive a light or a motor, or some other device which requires greater current or voltage levels than those provided by traditional logic signals such as ECL, PECL, TTL, or CMOS.

Figure 6:
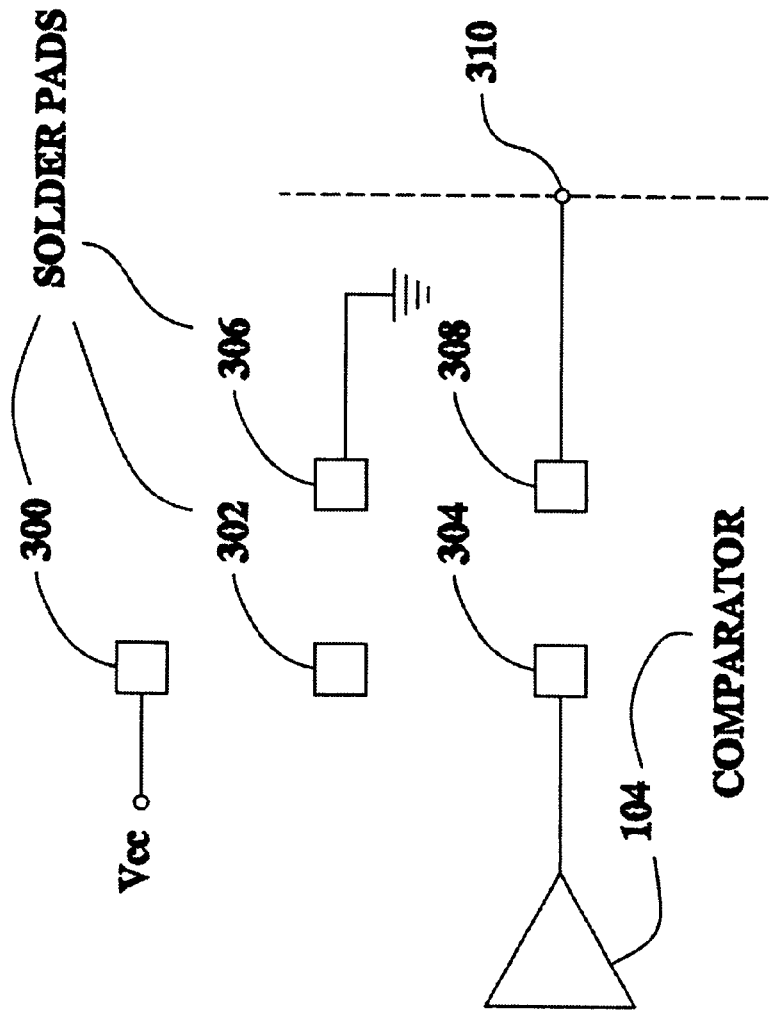
FIG. 6 show the physical layout of a printed circuit board which allows selective configurability of the SD output logic level.

Finally, FIG. 6 shows an adaptable configuration where the logic level of the SD output may be selected as required by a particular application. In this configuration, a series of solder pads 300, 302, 304, 306 and 308 are formed on the optoelectronic transceiver's printed circuit board. The solder pads need not be located precisely as shown, however for practical assembly reasons as well as for conserving real estate on the printed circuit board, it is preferred that all five solder pads are located in near proximity to one another, and that they are in turn located near the output of comparator 104. As shown, a first solder 300 pad is connected to the +5V power source Vcc, and another solder pad 306 is connected to ground. Another solder pad 304 is connected directly to the output of comparator 104, and the final solder pad 308 is connected to the SD output supplied to the host device mother board. This arrangement allows any of the previously described output configurations of FIGS. 3a, 3b, 4 and 5 to be implemented on the transceiver printed circuit board. The output configuration of FIG. 3 is implemented by connecting $R_7$ between solder pads 300 and 302, and connecting $R_8$ between solder pads 302 and 306. The output stage is completed by placing short circuit jumpers between solder pads 302–304, and between solder pads 304–308. Output configuration 3b is implemented by merely short circuiting solder pads 304–308. The output stage of FIG. 4 is achieved by placing $R_9$ between solder pads 300–302, and short circuiting solder pads 302–304 and 304–308. Finally, the high voltage/high current output stage of FIG. 5 can be implemented by soldering $R_{10}$ between solder pads 300–304 and $R_{11}$ between solder pads 302–304. The output circuit is completed by soldering the base of transistor $Q_1$ to solder pad 302, the collector to solder pad 308 and the emitter to solder pad 306. Thus, by providing this small number of nondedicated solder pads, the logic level of the SD output may be configured as needed on an application specific basis.

Referring now to FIG. 2 a schematic diagram of alternate signal detect circuitry is shown 200. Signal detect circuitry 200 does not monitor the received optical power directly. Instead, signal detect circuitry 200 receives an electrical AC data signal which has already been converted from the optical signal received over the optical transfer medium. Signal detect circuitry 200 divides the signal into an average component and a peak component. When the peak component exceeds the average component by a predetermined amount, the output is set to a true logic state indicating that a data signal has been detected.

The received data signal is input to signal line 202 from an amplifier or line driver output (not shown). The AC data signal is immediately split between two circuit paths, both which lead to comparator 208. The first circuit path, connected to the non-inverting terminal of comparator 208 includes resistor $R_{20}$, diode $D_1$, capacitor $C_2$, and resistor $R_{24}$. The second circuit path, connected to the inverting terminal of comparator 208 includes resistors $R_{21}$, $R_{23}$, and $R_{25}$, capacitor $C_1$, and diode $D_2$. The first circuit path acts as a peak detector. Resistor $R_{20}$ serves to isolate the AC signal from its source, and diode $D_1$, capacitor $C_2$, and Resistor $R_{24}$ form the peak detection circuitry. As the voltage of the AC data signal increases, $D_1$ is forward biased and $C_2$ rapidly charges to the voltage level of the incoming signal minus the forward voltage drop across $D_1$ (in the preferred embodiment, $D_1$ is selected to have a forward voltage drop of approximately 0.41V). Once the incoming signal reaches its peak voltage and starts to decline, the voltage stored in capacitor $C_2$ becomes greater than the voltage of the incoming signal, reverse biasing $D_1$. With $D_1$ reverse biased, $C_2$ discharges through $R_{24}$.

It is contemplated that the transceiver of the present invention will be operating at very high data rates such as 1.063 GHz. At such frequencies, the time period for each bit is extremely small. Often the communication protocol for the data signal will require the periodic transmission of a binary 1 so that the receiving device can sense the presence of a signal even if a long series of binary zeroes is being transmitted. $R_{24}$ and $C_2$ are sized to create a large RC time constant so that the time required to discharge $C_2$ across $R_{24}$ will be much greater than the maximum interval between received binary ones. Thus, capacitor $C_2$ will only discharge a negligible amount during the interval between a first received binary one and a second received binary one, even when the interval between the two received binary ones is the maximum allowed by the communication protocol. As soon as the next binary one is received, C2 will be recharged to the input signal's peak voltage. Thus, when a data signal is present, the voltage signal present at the non-inverting terminal of comparator 208 will equal the peak voltage of the incoming data signal minus the 0.41V forward voltage drop across $D_1$. When no data signal is present, capacitor $C_2$ will eventually discharge through $R_{24}$, and the voltage at the non-inverting terminal of comparator 208 will equal the quiescent output of the amplifier or line driver which is supplying the AC signal minus the 0.41V forward voltage drop across $D_1$.

The second circuit path, connecting the AC data signal to the inverting terminal of comparator 208, provides a voltage reference against which the peak signal voltage detected in the first circuit path is compared. Within the second circuit path, resistor $R_{21}$ serves a number of important functions. First, as with $R_{20}$, $R_2$, acts to isolate the output signal of the amplifier or line driver generating the AC signal. Second, in combination with capacitor $C_1$, $R_{21}$ forms a low pass filter. $R_{21}$ and $C_1$ effectively block the high frequency data signal and allow only the average voltage component of the AC signal to pass. Finally, $R_{21}$ forms a voltage divider with $R_{23}$ between a +5V dc supply voltage and the amplifier/line driver output. The effect of the voltage divider between $R_{21}$ and $R_{23}$ is to provide an offset voltage to the DC voltage signal output from the amplifier/line driver, increasing the voltage of the signal above the average voltage of the AC signals. The junction of $R_{21}$ and $R_{23}$ acts at the input to the remainder of the circuit.

Diode $D_2$ is included to provide an identical forward voltage drop in the average value signal as that caused by diode $D_1$ in the peak detection circuit. By providing an identical voltage drop, comparator 208 can make a true comparison between the relative values of the peak detect signal and the offset voltage of the average value signal, since they both will have been reduced by the identical 0.41V forward voltage drop across diodes $D_1$ and $D_2$. The diodes $D_1$ and $D_2$ are an unconnected pair of identical diodes contained in a single package. The two diodes have the same electrical characteristics, and since they are packaged together as a unit, they will react in the same way to thermal changes in their surroundings, creating an equal voltage drop in each of the signals passing therethrough. Identical 475 KΩ resistors are provided in $R_{24}$ and $R_{25}$ so that both diodes are forward biased in the same manner.

As noted, the first circuit path supplies a voltage signal to the non-inverting terminal of comparator 208 equal to the peak voltage of the input data signal minus the forward voltage drop across $D_1$. The second circuit path supplies a voltage signal to the inverting terminal of comparator 208 equal to the average voltage of the input data signal plus the offset voltage supplied by the voltage divider between $R_2$, and $R_{23}$, and minus the forward voltage drop across $D_2$. The offset voltage supplied by the voltage divider between $R_{21}$ and $R_{23}$ provides a threshold voltage for determining whether a data signal is being received by the transceiver. Comparator 208 compares the peak voltage signal present on the non-inverting terminal against the offset average voltage signal present at the inverting terminal. A voltage signal present at the non-inverting terminal greater than the voltage signal present at the inverting terminal corresponds to a "true" logic state indicating that a data signal is being received. Conversely, a voltage signal present at the non-inverting terminal below the voltage signal present at the inverting terminal, corresponds to a false logic state, indicating that a data signal is not being received. Thus, a data signal is detected when the peak voltage detected is greater than the average value of the data signal plus the voltage offset supplied by the voltage divider between $R_{21}$, and $R_{23}$.

The output stage of signal detect circuitry 200 may comprise any of the output configurations disclosed in FIGS. 3a, 3b, 4, and 5, and described with regard to the optical signal detect circuitry 100 of FIG. 1. Comparator 208 is the same as, or equivalent to the comparator 104 of the first embodiment, and therefore functions in the same manner. The operation of the various output stages is identical whether applied to the optical signal detect circuitry 100 of FIG. 1 or the AC signal detect circuitry 200 of FIG. 2, and therefore need not be discussed further here.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A 1×9 optoelectronic transceiver module having a TTL logic level signal detected output, comprising:

an SC-duplex receptacle disposed at a first end of the module for connecting to an SC-duplex fiber optic connector;

a single array of nine electrical contact pins disposed on a second end of the module;

a transmit optical sub-assembly on the module and configured to transmit optical signals over an optical transfer medium;

a receive optical sub-assembly on the module and configured to receive an optical signal and convert the optical signal to an electrical signal;

a data detect circuit on the module for providing an output signal in response to the electrical signal above a predetermined threshold; and a TTL output driver on the module for driving said output signal.

2. The 1×9 optoelectronic transceiver module of claim 1 wherein the data detect circuit includes a comparator having a first input driven by an output of the receive optical subassembly, and a second input driven by a reference voltage.

3. The 1×9 optoelectronic transceiver module of claim 2 wherein the TTL output driver includes a transistor and a passive biasing network.

4. The 1×9 optoelectronic transceiver module of claim 3 wherein the passive biasing network comprises first and second resistors connected in series, the junction between the first and second resistors also connected to the the transistor.

5. A 1×9 optoelectronic transceiver module having a signal detected output logic level exceeding 5 volts, comprising:

an SC-duplex receptacle disposed at a first end of the module for connecting to an SC-duplex fiber optic connector;

a single array of nine electrical contact pins disposed on a second end of the module;

a transmit optical sub-assembly on the module and configured to transmit optical signals over an optical transfer medium;

a receive optical sub-assembly on the module and configured to receive an optical signal and convert the optical signal to an electrical signal;

a data detect circuit on the module for providing an output signal in response to the electrical signal above a predetermined threshold; and an output driver capable of driving an output voltage over 5 volts on the module for driving said output signal.

6. The 1×9 optoelectronic transceiver module of claim 5 wherein the data detect circuit includes a comparator having a first input driven by output of the receive optical subassembly, and a second input driven by a reference voltage.

7. The 1×9 optoelectronic transceiver module of claim 6 wherein the output driver includes a transistor capable of sustaining an output voltage in excess of 5 volts that is driven by the output of the comparator.

8. The 1×9 optoelectronic transceiver module of claim 7 wherein the transistor comprises an open collector bi-polar junction transistor.

9. A 1×9 optoelectronic transceiver module having a CMOS logic level signal detected output, comprising:

an SC-duplex receptacle disposed at the first end of the module for connecting to an SC-duplex fiber optic connector;

a single array of nine electrical contact pins disposed on the second end of the module;

a receive optical sub-assembly on the module and configured to receive an optical signal and convert the optical signal to an electrical signal;

a transmit optical sub-assembly on the module and configured to transmit optical signals over an optical transfer medium;

a data detect circuit on the module for providing an output signal in response to the electrical signal above a predetermined threshold; and a CMOS output driver on the module for driving said output signal.

10. A 1×9 optoelectronic transceiver having a selectable logic level signal detected output, comprising:

an SC-duplex receptacle disposed at a first end of the module for connecting to an SC-duplex fiber optic connector;

a single array of nine electrical contact pins disposed on a second end of the module;

a transmit optical sub-assembly on the module and configured to transmit optical signals over an optical transfer medium;

a receive optical sub-assembly on the module and configured to receive an optical signal and convert the optical signal to an electrical signal;

a data detect circuit on the module for providing an output signal in response to the electrical signal above a predetermined threshold; and an output driver on the module for driving said output signal, said output driver comprising a comparator having an input driven by the data detect circuit, and said output driver further comprising a configurable output signal wherein the logic level of the configurable output signal is established by a selectable biasing network connected to an open collector transistor for providing said configurable output signal.

11. A signal detect output circuit to be placed in a 1×9 optoelectronic transceiver having a selectable logic level signal detect output, comprising:

a data detect circuit on the module for providing an output signal in response to the electrical signal above a predetermined threshold; and an output driver on the module for driving said output signal, said output driver comprising a comparator having an input driven by the data detect circuit, and said output driver further comprising a configurable output signal wherein the logic level of the configurable output signal is established by a selectable biasing network connected to an open collector transistor for providing said configurable output signal.

* * * * *